United States Patent [19]

Harris et al.

[11] Patent Number: 5,556,177
[45] Date of Patent: Sep. 17, 1996

[54] PROTECTING ABS SKID DETECTION AGAINST DATA CORRUPTION

[75] Inventors: Alan L. Harris, Coventry; Mark I. Phillips, Birmingham; Mark L. Howell, Leamington Spa, all of England

[73] Assignee: Lucas Industries Public Limited Company, Solihull, England

[21] Appl. No.: 380,696

[22] Filed: Jan. 30, 1995

[30] Foreign Application Priority Data

Jan. 29, 1994 [GB] United Kingdom .................. 9401728

[51] Int. Cl.$^6$ .................................................. B60T 8/34
[52] U.S. Cl. ........................... 303/174; 303/171; 303/187
[58] Field of Search ..................................... 303/174, 194, 303/195, 160, 167, 171, 172, 187; 364/426.02

[56] References Cited

U.S. PATENT DOCUMENTS

| | | | |
|---|---|---|---|
| 4,674,049 | 6/1987 | Kubo | 303/174 X |
| 5,335,178 | 8/1994 | Schafer et al. | 303/195 X |

FOREIGN PATENT DOCUMENTS

| | | |
|---|---|---|
| 0180721 | 5/1986 | European Pat. Off. . |
| 0330064 | 8/1989 | European Pat. Off. . |
| 0441122 | 8/1991 | European Pat. Off. . |
| WO82/02862 | 9/1982 | WIPO . |
| WO90/06250 | 6/1990 | WIPO . |

*Primary Examiner*—Robert J. Oberleitner
*Assistant Examiner*—Peter M. Poon
*Attorney, Agent, or Firm*—Oblon, Spivak, McClelland, Maier & Neustadt, P.C.

[57] ABSTRACT

An ABS skid detection protection system for a wheeled vehicle detects a predetermined level of deceleration at a wheel; detects, memorizers and holds for a prescribed period the wheel speed value at that predetermined deceleration level; detects whether the angular acceleration of the monitored wheel first falls below and then re-establishes the predetermined deceleration level within the prescribed level; and corrects the memorizsed value of wheel speed by subtracting from it an amount equal to the vehicle deceleration multiplied by either the elapsed time since the wheel speed value was memorized or the elapsed time since the initiation of a short-duration pulse by which the actuating pressure applied to a brake can be temporarily dumped upon detection of the predetermined level of deceleration of the wheel.

8 Claims, 6 Drawing Sheets

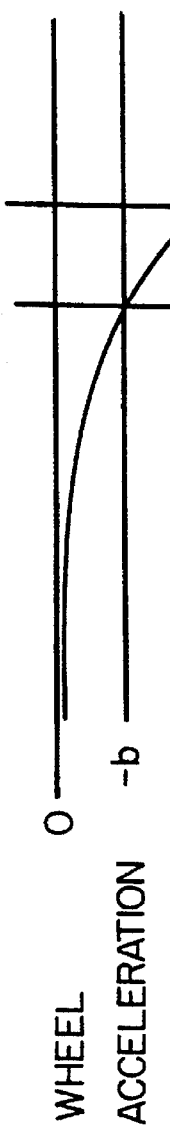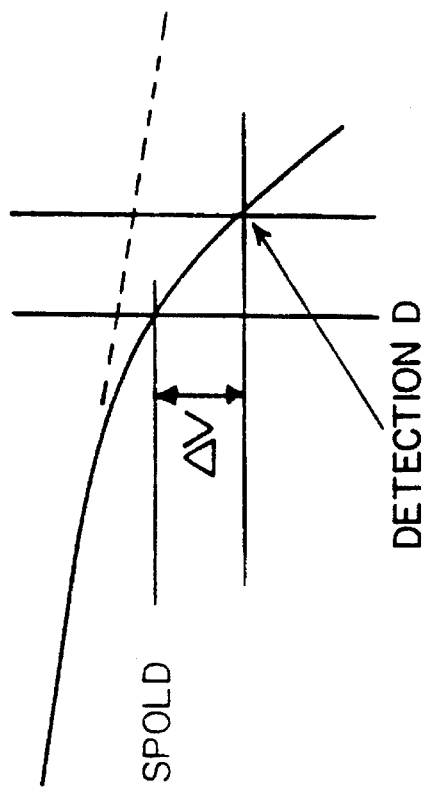
FIG. 2a PRIOR ART
FIG. 2b PRIOR ART
FIG. 2c PRIOR ART

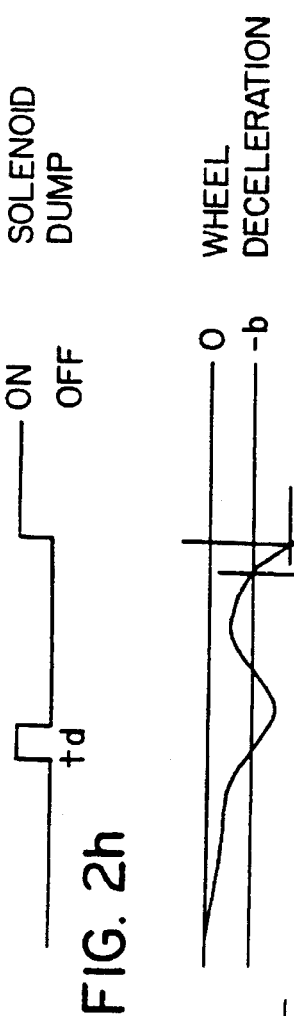
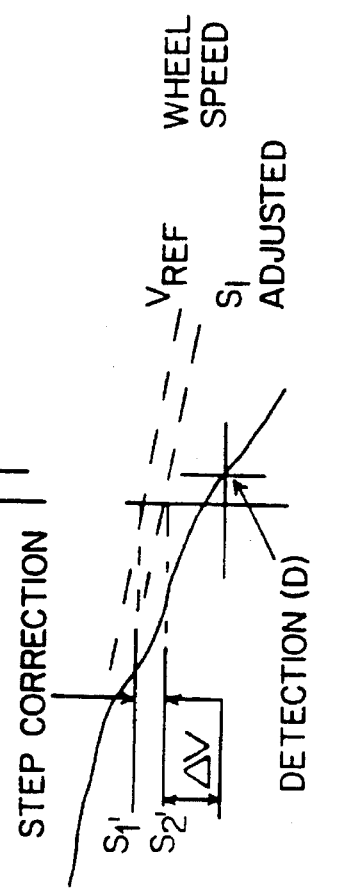
FIG. 2g
FIG. 2h
FIG. 2i
FIG. 2d
PRIOR ART
FIG. 2e
PRIOR ART
FIG. 2f
PRIOR ART

PROTECTING ABS SKID DETECTION AGAINST DATA CORRUPTION

This invention relates to a method of protecting ABS (anti-lock) skid detection against data corruption caused by the effects of suspension oscillation, such as may occur naturally or in response to an ABS-generated disturbance.

In the description which follows, the acronym SPOLD is used to identify a memorized vehicle wheel-speed value. It is derived from SPeed-OLD.

Within the context of ABS it is known to control the rate of brake pressure increase using pulses. In systems of the type using two-solenoids per braking channel, the pressure is increased in a series of steps, comprising a very rapid (~1300 bar/s) pressure increase of $\geq 5$ bar, interrupted by a series of hold periods during which the pressure remains constant. The effective rise-rate, i.e., viewed on a macro-scale, is modified by varying the duration either of the pressure-increase pulses or of the hold periods. An alternative type of system using flow valves is distinguished by a relatively slow (~130 bar/s) fixed pressure-rise characteristic which results from the constant flow rate. The effective rise-rate is varied by introducing a series of small-amplitude pressure dumps (~5 bar). Examples of the latter technique are in yaw-moment reduction (for split-$\mu$ road surfaces) and the efficiency—improving adaption processes, such as that described in our UK Patent Application No. 9306 426.9.

Thus, both of the above-described types of systems feature sudden ABS generated pressure changes during the brake re-apply phase which can lead to the problem described further hereinafter. It should be noted that the solution described herein, although described within a flow-valve context, is equally applicable to both systems, i.e. to two-solenoid/channel systems and flow-valve systems.

One commonly used method of skid detection is to memorize the wheel speed at the point in time when the wheel's angular deceleration exceeds a predetermined deceleration threshold (–b). If, while the angular deceleration remains above the threshold level (–b), the wheel-speed falls by more than a predetermined amount ($\Delta v$), then a skid condition is registered. The merit of this technique is that it avoids the need to measure absolute slip, which would depend too heavily upon an accurate interpretation of true vehicle speed. The values of –b and $\Delta v$ are chosen to provide an optimum compromise between smooth, efficient ABS control and acceptable immunity to road irregularities, which might otherwise cause reduced durability of the ABS components. The wheel-speed memory is erased if the angular deceleration falls below the threshold level (–b) before the $\Delta v$ value is reached.

If a pulse demand condition occurs as a result of a (–b) crossing taking place before the tire has reached the peak of the $\mu$/slip curve whether or not a pulse is actually executed there will be a sudden change in the brake force between the tire and the road, and this can cause the wheel to resonate in the longitudinal plane due to the flexibility of the tire, suspension and suspension mountings. Such vibration can disturb the skid-detection process, leading to late detection and consequent reductions in performance and comfort. If such a pulse demand condition occurs during the $\Delta v$ accumulation phase i.e. while the wheel's angular deceleration exceeds the threshold level, before its speed has reduced sufficiently to meet the $\Delta v$ threshold, then the positive half-cycle of the oscillation caused by the pulse or demand condition can allow the angular deceleration to fall below the threshold level momentarily, thus erasing the wheel-speed memory. (This description distinguishes in the interest of clarity between wheel acceleration and wheel deceleration (negative acceleration). However, oscillation is treated in the generic sense, so that the positive half-cycle involves a reduction in the existing level of deceleration). Even if the (–b) level is immediately re-established by the subsequent negative half-cycle, the skid-detection process must now start again; and if the $\Delta v$ accumulation was relatively far advanced when the pulse demand condition occurred, then the delay caused by starting again will be reflected in a higher slip level at the (–b) (and hence also at the detection) point. The consequences of late detection are loss of comfort and performance due to the more violent changes in the tire-to-road forces which result from the increased maximum slip levels and more extreme pressure modulation.

One object of the present invention is to provide a solution to the aforegoing problem.

In accordance with a first aspect of the present invention, the wheel-speed is memorized at a predetermined deceleration level and the memorized value is then maintained for a prescribed period, and, in the event that the angular acceleration of a monitored wheel first falls below and then re-establishes said predetermined deceleration level within the prescribed period, the memorized value is corrected by subtracting from it an amount equal to the vehicle deceleration multiplied by the elapsed time since the wheel speed value was memorized.

In accordance with a second aspect of the present invention the wheel-speed is memorized at a predetermined deceleration level and the memorized value is then maintained for a prescribed period following an ABS generated pulse and, in the event that the angular acceleration of the monitored wheel first falls below and then re-establishes said predetermined deceleration level within said prescribed period, the memorized value is corrected by subtracting from it an amount equal to the vehicle deceleration multiplied by the elapsed time since said pulse.

The corrected wheel-speed value is used in the determination of the amount of wheel speed drop ($\Delta v$), which is to occur before a skid detection is triggered.

This therefore enables the wheel speed value before the pulse, or wheel oscillation causing a first (–b) crossing occurrence, to be used so avoiding having to rely upon a post-pulse, or post oscillation value which may have been corrupted by the effects of the pulse, or the oscillation itself. The result is that the time at which the accumulation of the $\Delta v$ value is initiated is effectively advanced compared to what would otherwise happen and detection of a skid condition therefore occurs earlier.

The invention is described further hereinafter, by way of example only, with reference to the accompanying drawings, in which:

FIGS. 2a, 2b, 2c, 2d, 2e, 2f, 2g, 2h and 2i illustrate respectively the operation of an ABS system in recognizing the wheel speed/deceleration level at which ABS pulses are to be triggered having (a–c) "normal" basic detection, (d–f) detection delayed by additional "pre-pulse", and (g–i) delay resulting from additional "pre-pulse" reduced by the "hold-spold" technique of the present invention;

Figure 1:
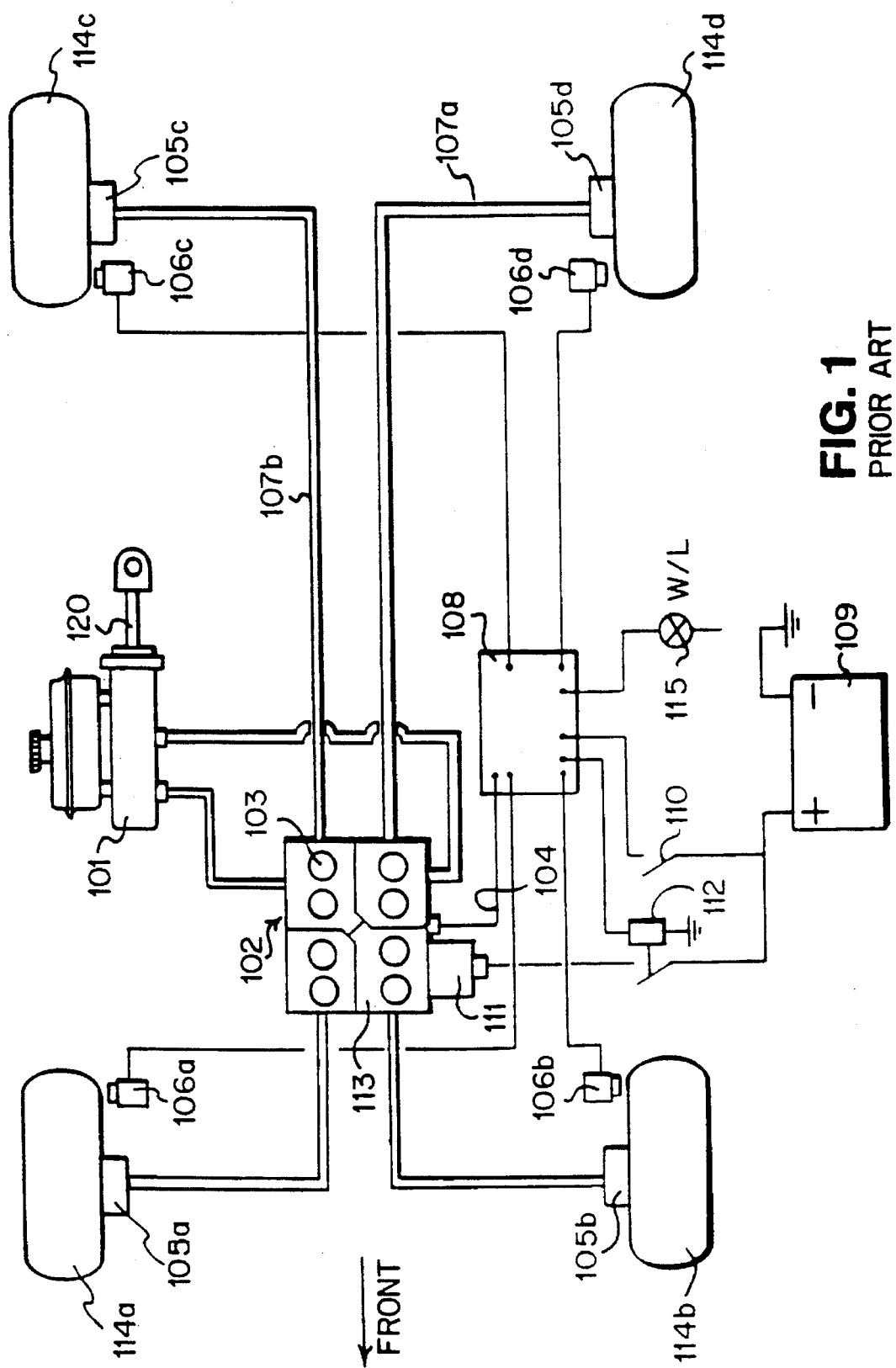
FIG. 1 is a schematic diagram of the basic hydraulic and electrical arrangement of a typical vehicle to which the present invention can be applied.

Referring first to FIG. 1, there is illustrated highly schematically the braking system for a vehicle having four wheels 114, two at the front 114a, 114b and two at the rear 114c, 114d. The system is of the X-split type having independent hydraulic circuits, with the first circuit 107a (black) actuating the front offside and rear nearside wheel brakes 105a 105d and the second circuit 107b actuating the front nearside and rear offside wheel brakes 105b, 105c. A brake pedal (not shown) is mechanically connected to the actuating plunger 120 of a dual circuit master cylinder 101. The master cylinder 101 is connected to a modulator 102 comprising a plurality of control channels 113 having control valves 103, connected to an electronic control unit (ECU) 108 by control lines 104, the control valves 103 being adapted to control the communication between the master cylinder 101 and the brake actuators 105 controlling the wheels 114. Rotational speed of each wheel 114 is sensed individually by wheel speed sensors 106a–106d connected to the ECU 108 which is adapted to control the control valves 103 of the modulator 102 in dependence upon signals received from the wheel speed sensors 106.

The ECU 108 is powered from a battery/alternator circuit 109 of the vehicle via an ignition switch 110. The battery/alternator circuit 109 also supplies power to modulator pump motor 111 via a relay 112 controlled from signals generated by the ECU 108. Should the ECU 108 determine that an appropriate fault has occurred then a fault warning indicator (warning lamp) 115 is activated.

Figure 4:
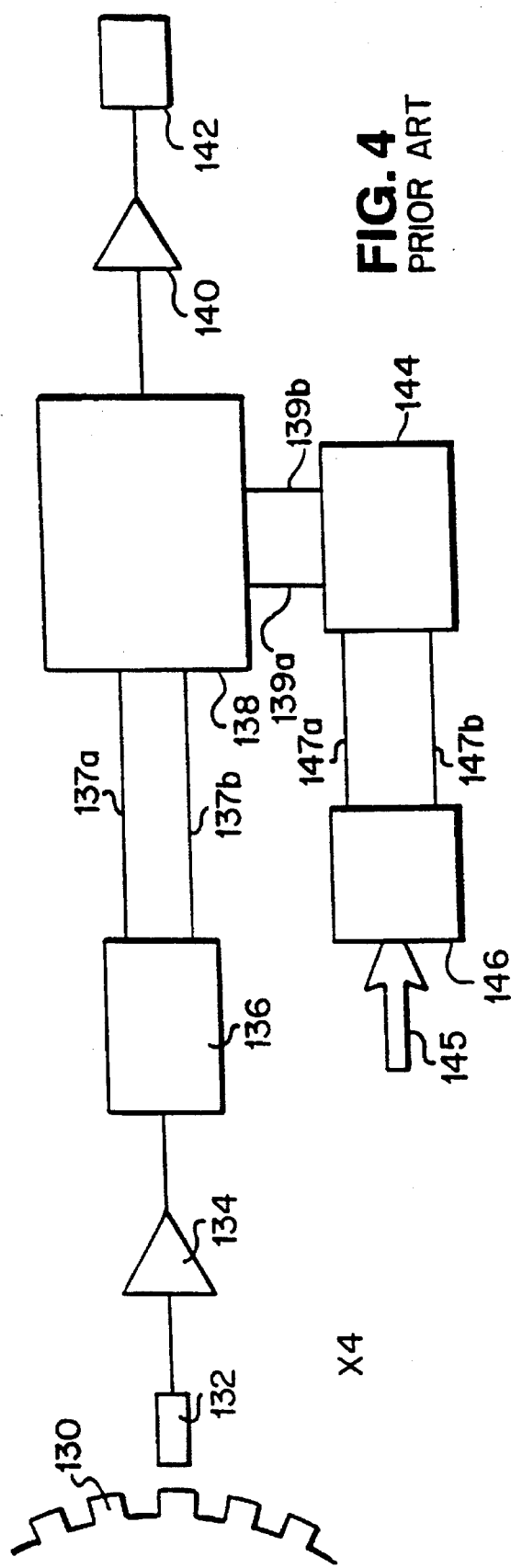
FIG. 4 is a schematic diagram illustrating the basic ABS function of the braking system.

Referring now to FIG. 4, there is illustrated a typical overall ABS system layout. Each vehicle wheel carries a respective exciter 130 whose rotation is detected by a sensor 132. The sensor signal, after signal conditioning at 134, is passed to a wheel speed and wheel deceleration calculating means 136 which establishes a wheel speed signal and a wheel acceleration/deceleration signal on lines 137a, 137b, respectively. The latter signals are passed to a computer 138 for calculating the relevant ABS functions. The wheel speed signals are also input at 145 to a vehicle speed and acceleration estimation means 146 which establishes a vehicle speed signal and a vehicle acceleration signal on lines 147a and 147b, respectively. The latter signals are fed to a skid detection threshold calculating means 144 which provides to the computer 138 a slip threshold signal and a deceleration threshold signal on lines 139a and 139b, respectively. The computer uses the various signals to control the operation of a dump solenoid 142 via solenoid drive means 140.

Referring now to FIGS. 2a–2i, in each of these Figures the upper curve corresponds to the actuating state of the solenoid controlling the relief of pressure from the respective brake actuator, the middle curve identifies the wheel acceleration and the bottom curve shows wheel speed.

In the basic system operation of FIG. 2(a–c), when it has been detected that a wheel speed fluctuation or oscillation has occurred whereby the wheel acceleration (deceleration) has fallen to the –b point, the ensuing slip values Δv are accumulated up to a predetermined slip threshold whereat the detection point (D) is established at which the solenoid will be fired.

FIG. 2(d–f) corresponds to the conventional improvement to the basic control logic of FIG. 2(a) which introduces an initial delaying pulse (td) upon detection of a predetermined level of deceleration at a wheel typically, but not necessarily, (–b). Conventionally, this pre-pulse (td) is a short pulse which attempts to slow down the rate of deceleration of a wheel, without compromising the braking effect.

Further detection of a wheel skid after this pre-pulse is accomplished in the conventional manner by detecting a level of deceleration (–b) and further accumulating the ensuring slip values Δv up to the slip threshold where the detection point is established.

As can be seen from FIG. 2(d–f), the actual speed of the wheel is still decreasing during the changes in acceleration from the first (–b) point to the second (–b) point. Thus, using the detection method of FIG. 2(b), which continues the conventional "normal detection" method of FIG. 2(a–c) with a pre-pulse (td), causes the true detection to happen at a point where the actual slip is much greater than would normally have been achieved if the pre-pulse had not been used. This is because the speed of the wheel at the second (–b) detection point (ie the second time (–b) is crossed in a negatively moving direction) is much lower than at the first (–b) detection point. Thus, the improvement in using a pre-pulse to provide a delay in releasing the brakes and therefore improving the brake utilization of the skid cycle is offset by a decrease in performance due to late detection of a true skid at a higher than desired actual slip level, which causes the wheel to skid more deeply, which in turn means that the brake has to remain pressure-dumped longer.

It should be noted that the fluctuation/oscillation in wheel deceleration causing the crossing of the (–b) deceleration level could be caused without an ABS generated pulse by a vehicle-induced dynamic change where the criteria for issuing a demand for a SHORT DURATION PULSE (td) are detected by the system but not necessarily acted upon, i.e. the pulse could be intentionally blocked, for example for the reasons explained in our copending PCT Application GB94/01259 to which reference is hereby directed.

Referring now to FIG. 2(g–i), in one example of the present system described herein, the problem of late detection at high slip levels is overcome by calculation of Δv from a memorized value of the old speed (SPOLD) that was obtained and noted at the first (–b) detection threshold. The old wheel speed or SPOLD value is corrected in line with the decrease in vehicle speed V, usually at the time of detection of the second (–b) detection threshold. In, for example, a case where a pre-pulse (td) is generated, the present system can therefore allow the full benefit of the pre-pulse (td) to be realized in combination with a more accurate calculation of the optimum skid detection point that prevents the wheel from skidding too deeply.

Thus, in one example of a system in accordance with the present invention, the wheel speed memory (SPOLD) is held for a prescribed period following a pulse, the stored (SPOLD) value being corrected in the event that the angular deceleration first falls below, and then re-establishes the threshold level within the prescribed period. The correction comprises subtraction from the memorized SPOLD value of an amount equal to the elapsed time x the vehicle deceleration. By "prescribed", we include the possibility that the period may be adapted in accordance with one or more vehicle parameters such as vehicle speed and/or tire to road surface friction.

i.e. New Value=Old Value–(Elapsed Time Since Old Value×Vehicle Deceleration)

In an alternative form of the invention which reduced the computer systems RAM requirement or overhead allocated for this individual process, the time since the initiation of the pulse (td) is used for the calculation of the new value. Thus the equation becomes:

New Value=Old Value–(Elapsed Time Since Pulse×Vehicle Deceleration)

This allows the same timer to be used for the Elapsed Time and the Prescribed Period. Experience shows that this is an acceptable compromise.

In both cases, the purpose of the correction is to permit the use of the wheel-speed value memorised before the pulse occurred and thus avoid reliance upon a post-pulse value, the relevance of which may have been corrupted by effects of the pulse.

The effect of the correction is to compensate for the reduction in vehicle speed which occurs during the period of "amnesia" caused by the pulse.

The correction logic can be applied following any type of pressure rise-rate adaptation pulse, and can be applied to each pulse in a series. Alternatively, the correction logic can be applied following detection of a first (−b) crossing, even if a pressure rise-rate adaptation pulse is not actually issued.

Through the use of this invention it becomes more practicable to extend the operating range of adaptation pulse to include high-μ surfaces, where oscillation is stronger.

It will be seen by comparison of the lower curves in FIGS. 2(d–f) and 2(g–i) that the detection point on the wheel velocity (slip) curve of FIG. 2(g–i) occurs higher up the curve than in the curve of FIG. 2(d–f) by the amount indicated as "B". It will also be noted that the point on the wheel acceleration curve of FIG. 2(g–i) corresponding to the detection point occurs higher up the curve than in the curve of FIG. 2(d–f) by the amount indicated as "C". These comparisons are highlighted to demonstrate the improved performance provided by the present invention in compensating for the reduction in speed described hereinbefore during the period following the pre-pulse or (−b) deceleration point first crossing.

Figure 3:
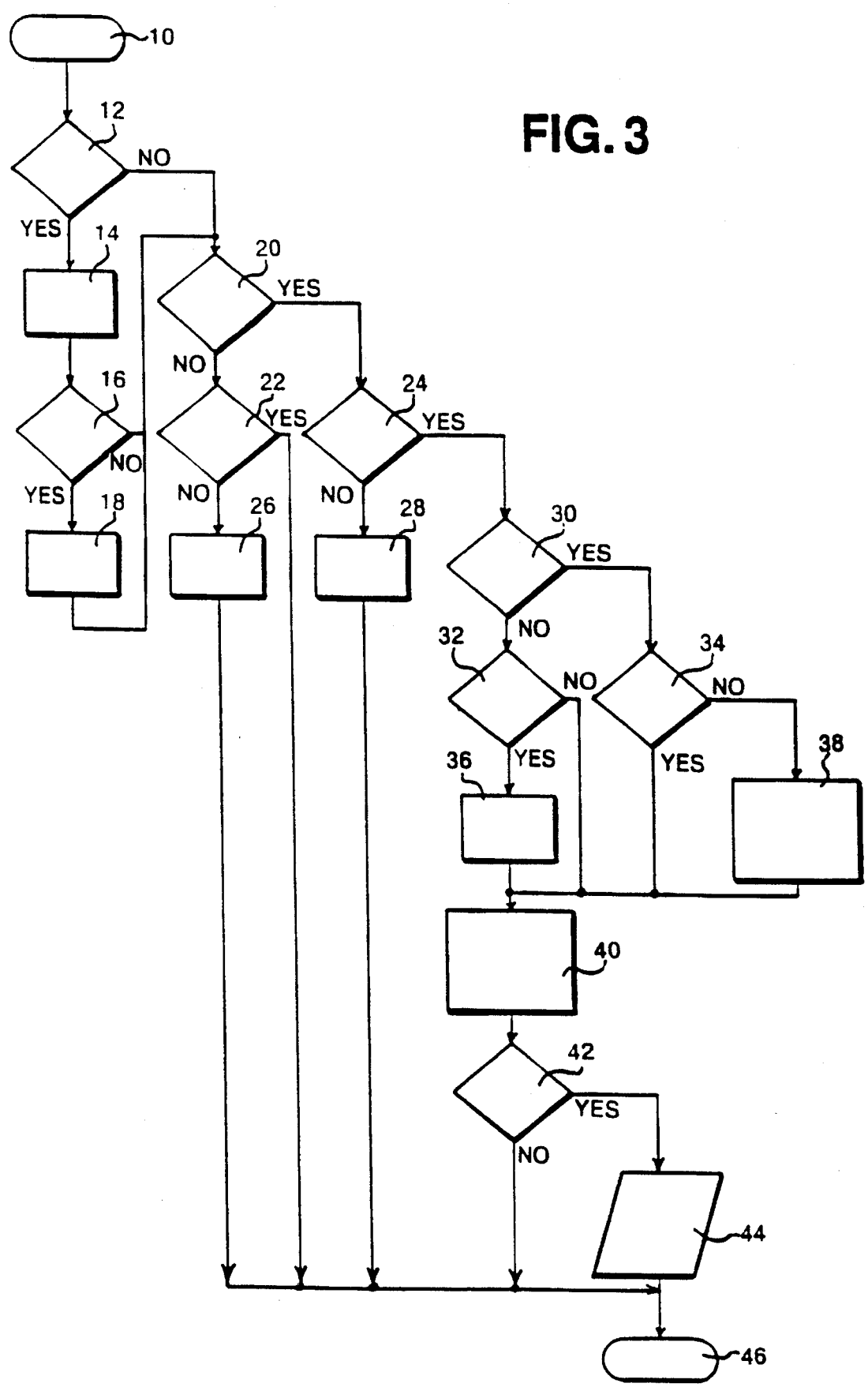
FIG. 3 is a logic flow diagram showing one example of the operation of a system incorporating the present invention.

FIG. 3 shows an example of the present "holdspold" logic. When the wheel acceleration (arad) falls below the (−b) threshold (i.e. in a deceleration direction), the wheel speed is stored as the vehicle "SPOLD". If a solenoid pulse occurs, a window is opened (eg 70 ms). If while this window is open the wheel acceleration rises back above the (−b) threshold (ie goes less −ve), the spold value is held. (Hence the expression "Hold spold".) If while the window is still open, the wheel acceleration falls below the (−b) threshold again, the spold is updated according to the formula:

spold=higher of: [(current wheel speed) or (SPOLD−afz×time)]

where afz=vehicle acceleration, time=time since dump solenoid pulse.

If the 70 ms window expires while the wheel acceleration is above the (−b) threshold (ie less −ve), the spold is cleared, and a new value will be read at the next (−b) crossing, as normal. Although we have referred here to the window being of 70 ms duration, the actual duration time of this window in a practical system is tuned to the natural resonant frequency of the suspension system of the vehicle. It is therefore not a constant value for all installations. Typically, the duration may be made up of a proportion estimated or measured to correspond to the natural frequency of the suspension system, plus a reasonable margin to allow for variations in this value.

If vehicle acceleration is ≧(say) −0.4 g (ie low μ), the hold spold logic is not applied.

If the vehicle acceleration is unknown (eg because the stop has not been in progress for long enough) the hold spold logic is not applied.

The various steps (boxes) included in FIG. 3 can be identified as follows:

10—start
12—is the "hold spold" window open?
14—update the window timer
16—is it time to close the window?
18—close the "hold spold" window
20—is wheel acceleration ≦−b?
22—is the "hold spold" window open?
24—has a value of "spold" already been stored?
26—clear spold
28—set spold=current wheel speed
30—is the "hold spold" window open?
32—is there a solenoid pulse?
34—was the wheel acceleration ≦−b last time?
36—open the "hold spold" window
38—update "spold": spold=old spold (vehicle acceleration× time since "hold spold" window was opened)
40—speed difference=spold-current wheel speed
42—is speed difference ≧Δv threshold?
44—detection achieved, fire the solenoid
46—exit.

Figure 5:
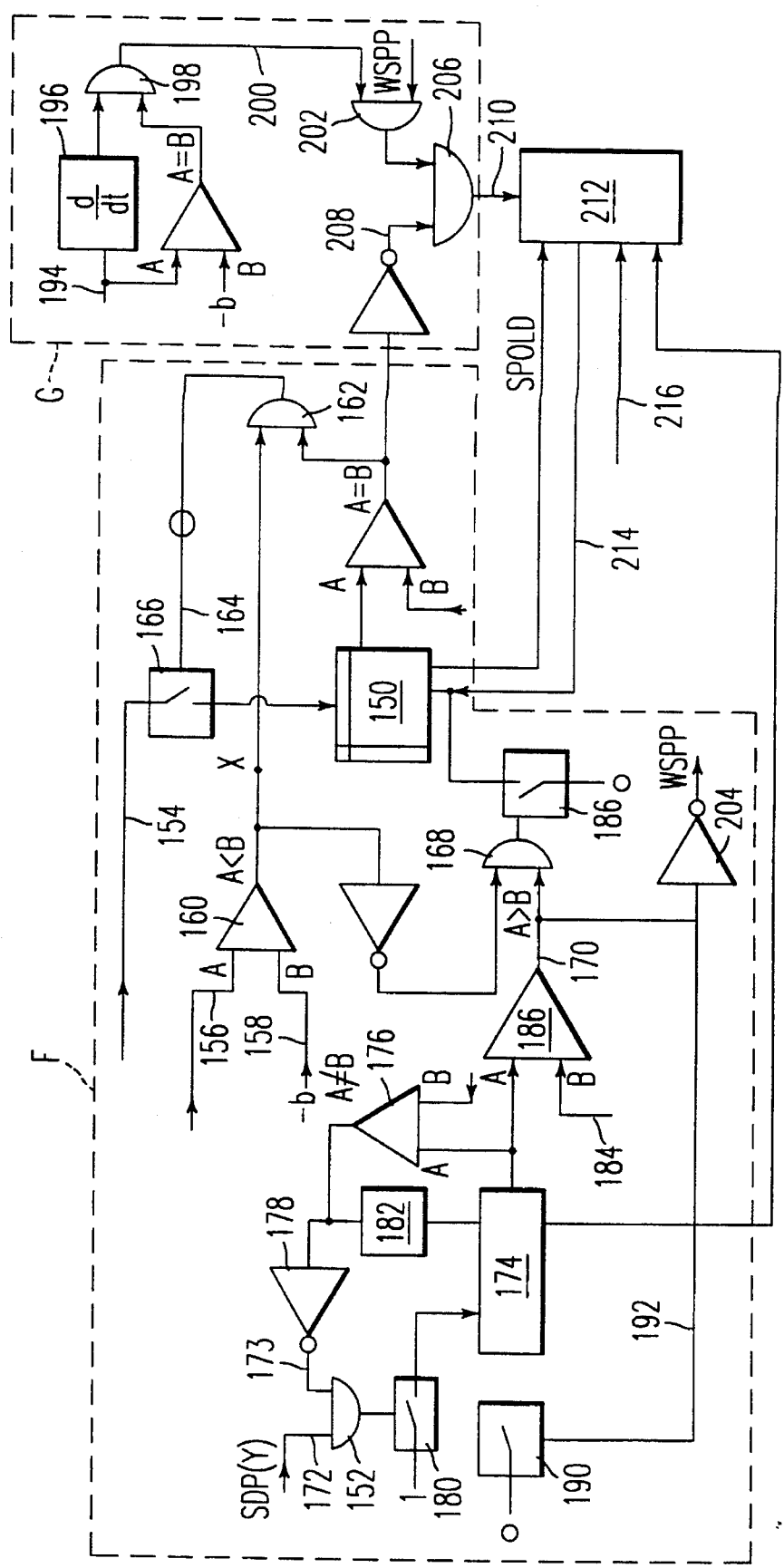
FIG. 5 is a diagrammatic illustration of one possible embodiment of hardware for achieving the operation of the present invention.

Referring now to FIG. 5, there is shown an embodiment of a system for developing a value of SPOLD (as hereinbefore defined) in a SPOLD store 150 that can be used in the system of FIG. 6, described hereinafter, together with slip threshold, wheel speed and (−b) signals to control the operation of the pressure dump solenoid 142 (FIG. 4).

The description of FIGS. 2(a) to 2(i) stated that the initiation of the HOLD SPOLD feature in at least some embodiments of the present invention followed the issuance of the short duration pulse (td) generated upon recognition of a first (−b) crossing. Thus, in that case, the second (−b) crossing arose because the temporary dumping of the brakes during the period (td) of this short duration pulse. However, the HOLD SPOLD may equally well be initiated following a first (−b) crossing arising simply from movement of the vehicle suspension causing a wheel disturbance, at a time where a demand for a short duration pulse (SDP) is established but not necessarily actually used.

The system shown in FIG. 5 assumes that a short duration pulse has in fact been issued (as in FIGS. 2(a)–2(c) to trigger the SPOLD calculation and a SHORT DURATION PULSE demand signal (SDP) is therefore present at the input of an AND gate 152.

A wheel-speed signal is input onto a line 154, a wheel acceleration signal is input onto a line 156 and the (−b) signal is input onto a line 158. The wheel speed and acceleration signals are monitored in that, when the wheel acceleration level on line 156 drops and becomes less than (−b), the output of a first DECELERATION DETECT comparator 160 becomes TRUE. This TRUE signal is applied to one input of an AND gate 162 whose other input is TRUE when the value held in the SPOLD STORE 150 is zero, ie the first occurrence of the (−b) crossing in this particular cycle of the ABS control system. The AND gate 162 provides an ENABLE signal on a line 164 to a switch 166 which, when fired, loads the prevailing (current) wheel speed value on line 154 (first (−b) crossing) into the SPOLD HOLD store 150. The loading of this value immediately DISABLES the switch 166 since the value in the SPOLD STORE 150 is no longer zero. The resetting to zero of the SPOLD STORE 150 is controlled by an AND gate 168 whose first input is an inversion of the detected DECELERATION SIGNAL from the comparator 160 ie. its first input is TRUE when the wheel deceleration is less than (−b). The second input to the AND gate 168 on line 170 is a signal which corresponds to the time from the initial SHORT DURATION PULSE (SDP) (or first −b crossing) becoming greater than a PRESCRIBED PERIOD. In this embodiment, the timing of the latter PERIOD starts from the start of the SDP pulse. If it is assumed that a wheel speed oscillation has occurred because of the issuance of such an SDP pulse, then the following operation occurs.

The SDP pulse applied via the line 172 is ANDed in the AND gate 152 with a signal on a line 173 which is TRUE when the value of a TIMER 174 is zero, ie. when a TIMER COMPARATOR 176 sees zero at both its inputs, generating a FALSE signal which is inverted at 178 to provide a second TRUE signal at the AND gate 152. The AND gate 152 loads a "1" into the TIMER 174 via a switch 180 whose presence generates a TRUE signal from the TIMER COMPARATOR 176, thus disabling the loading of the "1" signal and starting up an INCREMENTER 182. The TIMER 174 runs and its value increases and is compared in a COMPARATOR 186 with the abovementioned PRESCRIBED PERIOD applied via line 184. If the TIMER exceeds said period then the second input to the AND gate 168 becomes TRUE which then resets the value in the SPOLD STORE to zero via a switch 186. The TIMER 174 is itself reset since the output of the comparator 186 also enables a second zero-setting switch 190 via a line 192.

The aforegoing components encircled by a dotted line F provides a means for detecting, memorizing and holding for a prescribed period the wheel speed at the predetermined acceleration threshold (−b).

The result of the aforegoing operation is to store the wheel speed at the first (−b) crossing until the expiration of the period and then to reset the SPOLD STORE to zero. If during this period a second crossing of the (−b) threshold is seen, then a signal indicating such is generated. The portion of the circuit of FIG. 5 encircled by dotted line G achieves this by monitoring the wheel acceleration on a line 194 and differentiating this signal in a DIFFERENTIATOR 196 to provide an input to an AND gate 198 which is TRUE if the result of the differentiation is negative, i.e. the wheel is decelerating. The second input to the AND gate 198 is a signal which is TRUE when said wheel acceleration on line 194 is equal to the (−b) threshold. Therefore, the resulting output from this AND gate 198 is TRUE when the wheel reaches the (−b) threshold and is decelerating. This TRUE signal on line 200 is ANDed in a further AND gate 202 with a signal derived from the period timer of WSPP (=Within Said Prescribed Period). This signal is TRUE when the output of the PRESCRIBED PERIOD COMPARATOR 186 is FALSE due to an inversion at an INVERTER 204. If both of these TRUE signals are present, then a TRUE output is produced by the AND gate 202 which is itself ANDed in an AND gate 206 with a signal on a line 208 from the SPOLD STORE 150 which is true when the value in the SPOLD STORE 150 is not zero. This ANDing in the gate 206 produces an ENABLE signal on a line 210 to a SPOLD CALCULATOR 212 whose function is to form a modified SPOLD value equal to the existing SPOLD value minus an amount equal to the elapsed time from the TIMER 174 multiplied by the vehicle acceleration. This has the effect of correcting, by way of a line 214, the value held in the SPOLD STORE 150 by an amount equal to the vehicle deceleration multiplied by the elapsed time. The SPOLD CALCULATOR receives the vehicle acceleration/deceleration signal via a line 216.

Figure 6:
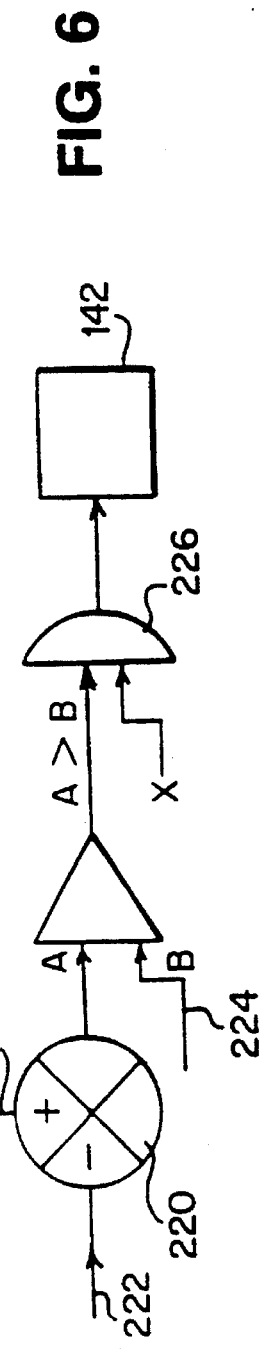
FIG. 6 is a diagrammatic illustration of a second embodiment.

As shown in FIG. 6, the updated value of SPOLD on line 218 is subtracted in a SUBTRACTOR 220 from a signal representative of the SLIP THRESHOLD applied via a line 222 and, when the wheel speed entered on line 224 becomes less than this amount and the wheel acceleration is less than (−b) (as at the point "X" in FIG. 5), then the dump solenoid 142 of the braked wheel under control is fired by way of a further AND gate 226.

In an alternative arrangement using the same system and operating in the same manner as in FIG. 5, the SDP signal input on line 172 which starts the TIMER 174 is replaced by a signal Y responsive to the detection of the first (−b) crossing per se, as indicated in brackets in FIG. 5.

We claim:

1. An ABS skid detection protection system for a vehicle having wheels, comprising:

(a) means for determining the prevailing accelerations of the vehicle wheels;

(b) means for detection of a predetermined level of deceleration at a wheel;

(c) means for detecting, memorizing and holding for a prescribed period the wheel speed value at said predetermined deceleration level;

(d) means for establishing the elapsed time since said wheel speed value was memorized;

(e) means for detecting whether the angular acceleration of a monitored wheel first falls below and then reestablishes said predetermined deceleration level within said prescribed period; and (f) means for correcting the memorized value of wheel speed by subtracting from it an amount equal to the vehicle deceleration multiplied by said elapsed time since said wheel speed value was memorized.

2. An ABS skid detection protection system according to claim 1, including means for receiving said corrected memorized value of wheel speed and subtracting same from a signal representative of a predetermined slip threshold to provide an adjusted slip threshold value, means for detecting whether said adjusted slip threshold is greater than the prevailing wheel speed, and means for generating a dump solenoid firing signal when said adjusted slip threshold is greater than the prevailing wheel speed and the wheel acceleration is less than said predetermined level.

3. An ABS skid detection protection system according to claim 1, wherein said period is a predetermined period.

4. An ABS skid detection protection system according to claim 1, wherein said period is a period derived within the system from at least one vehicle parameter.

5. An ABS skid detection protection system for a vehicle having wheels comprising:

(a) means for determining the prevailing accelerations of the vehicle wheels;

(b) means for forming a short-duration pre-pulse by which the actuating pressure applied to a brake can be temporarily dumped upon detection of a predetermined level of deceleration at a wheel;

(c) means for detecting, memorizing and holding for a prescribed period the wheel speed value at said predetermined deceleration level;

(d) means for detecting whether the angular acceleration of a monitored wheel first falls below and then reestablishes said predetermined deceleration level within said prescribed period; and (e) means for correcting said memorized value of wheel speed by subtracting from it an amount equal to the vehicle deceleration multiplied by one of the elapsed time since the wheel speed value was memorized and the elapsed time since said pulse.

6. An ABS skid detection protection system according to claim 5, including means for receiving said corrected memorized value of wheel speed and subtracting same from a signal representative of a predetermined slip threshold to provide an adjusted slip threshold value, means for detecting whether said adjusted slip threshold is greater than the prevailing wheel speed, and means for generating a dump solenoid firing signal when said adjusted slip threshold is greater than the prevailing wheel speed and the wheel acceleration is less than said predetermined level.

7. An ABS skid detection protection system according to claim 6, wherein said period is a predetermined period.

8. An ABS skid detection protection system according to claim 5, wherein said period is a period derived within the system from at least one vehicle parameter.

* * * * *